United States Patent [19]
Micke

[11] Patent Number: 4,887,697
[45] Date of Patent: Dec. 19, 1989

[54] BRAKE ACTUATOR

[75] Inventor: Sigmar Micke, Koblenz Metternich, Fed. Rep. of Germany

[73] Assignee: Lucas Industries Public Limited Company, Birmingham, England

[21] Appl. No.: 100,910

[22] Filed: Sep. 25, 1987

[30] Foreign Application Priority Data

Sep. 26, 1986 [GB] United Kingdom ............... 8623225

[51] Int. Cl.$^4$ ............................................. F16D 65/56
[52] U.S. Cl. .................................. 188/79.62; 74/110; 188/196 D; 188/217; 188/343; 192/93 C; 192/111 A
[58] Field of Search ............... 188/343, 196 D, 79.56, 188/79.55, 79.57, 79.58, 79.59, 79.62, 328, 217, 196 BA; 74/110; 192/93 C, 111 A

[56] References Cited

U.S. PATENT DOCUMENTS

| | | | |
|---|---|---|---|
| 1,848,775 | 3/1932 | Girling | 188/343 X |
| 3,302,473 | 2/1967 | Lowry et al. | 74/110 |
| 3,599,763 | 8/1971 | Bailey | 188/343 X |
| 3,838,757 | 10/1974 | Farr | 188/196 D X |
| 3,994,371 | 11/1976 | Farr | 188/343 |
| 4,688,661 | 8/1987 | Gockel et al. | 188/196 D |
| 4,699,256 | 10/1987 | Severinsson | 188/343 |

Primary Examiner—George E. A. Halvosa
Attorney, Agent, or Firm—Fleit, Jacobson, Cohn, Price, Holman & Stern

[57] ABSTRACT

A wedge and roller brake actuator comprises a wedge disposed between opposed tappets with interposed rollers acting to transmit thrust from the wedge to the tappets for brake actuation, a fixed inclined surface engaged by one roller to restrain the wedge for linear movement, and to ensure that one of the tappets normally associated, in use, with the brake trailing shoe, applies its associated shoe in advance of the other tappet, either the roller-engaging surfaces of the wedge and opposed tappet at either side of the wedge are inclined at different angles to the wedge longitudinal axis, or respective adjusters of the tappets are provided with different clearances between threadedly interengaged components thereof so that one tappet is adjusted to maintain its associated shoe nearer to the drum than the shoe associated with other tappet.

12 Claims, 3 Drawing Sheets

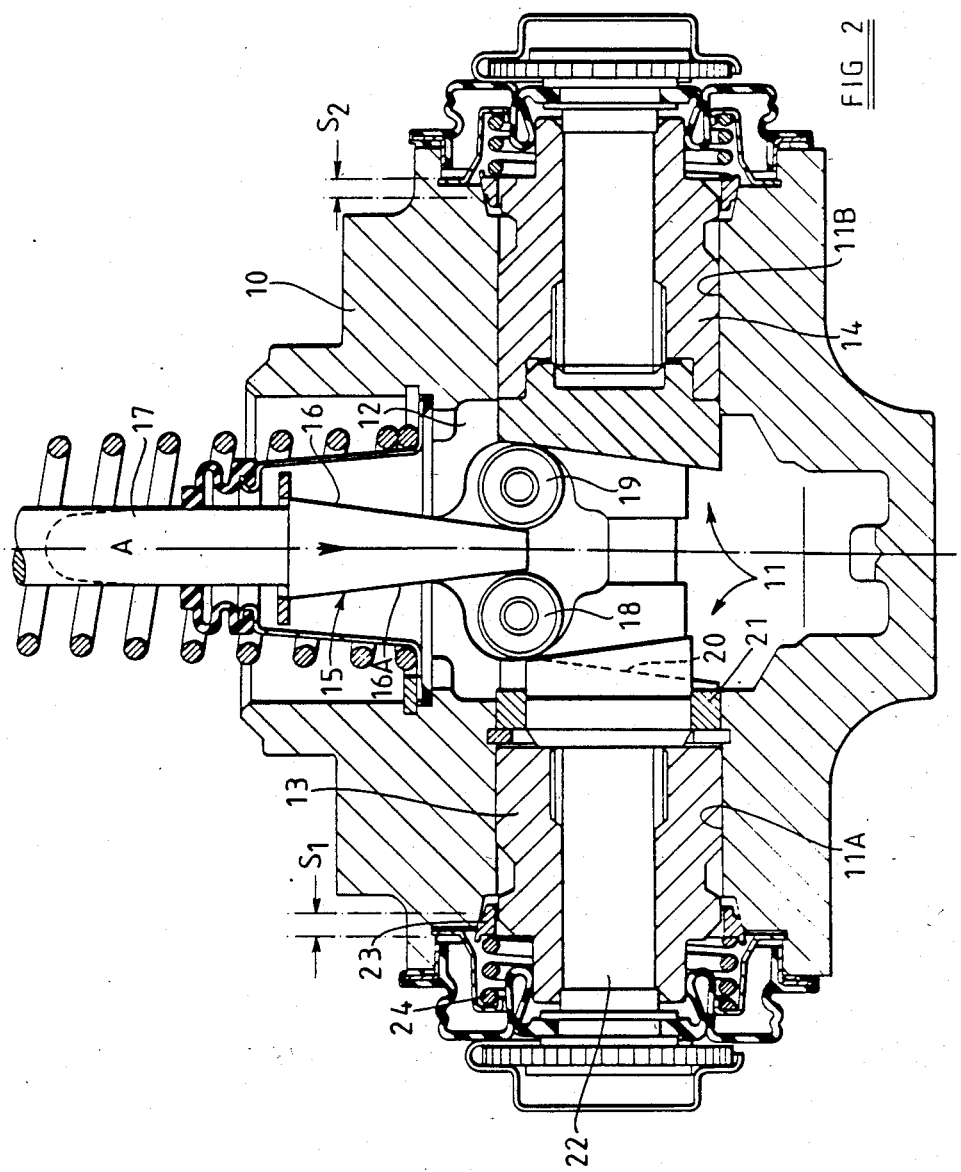

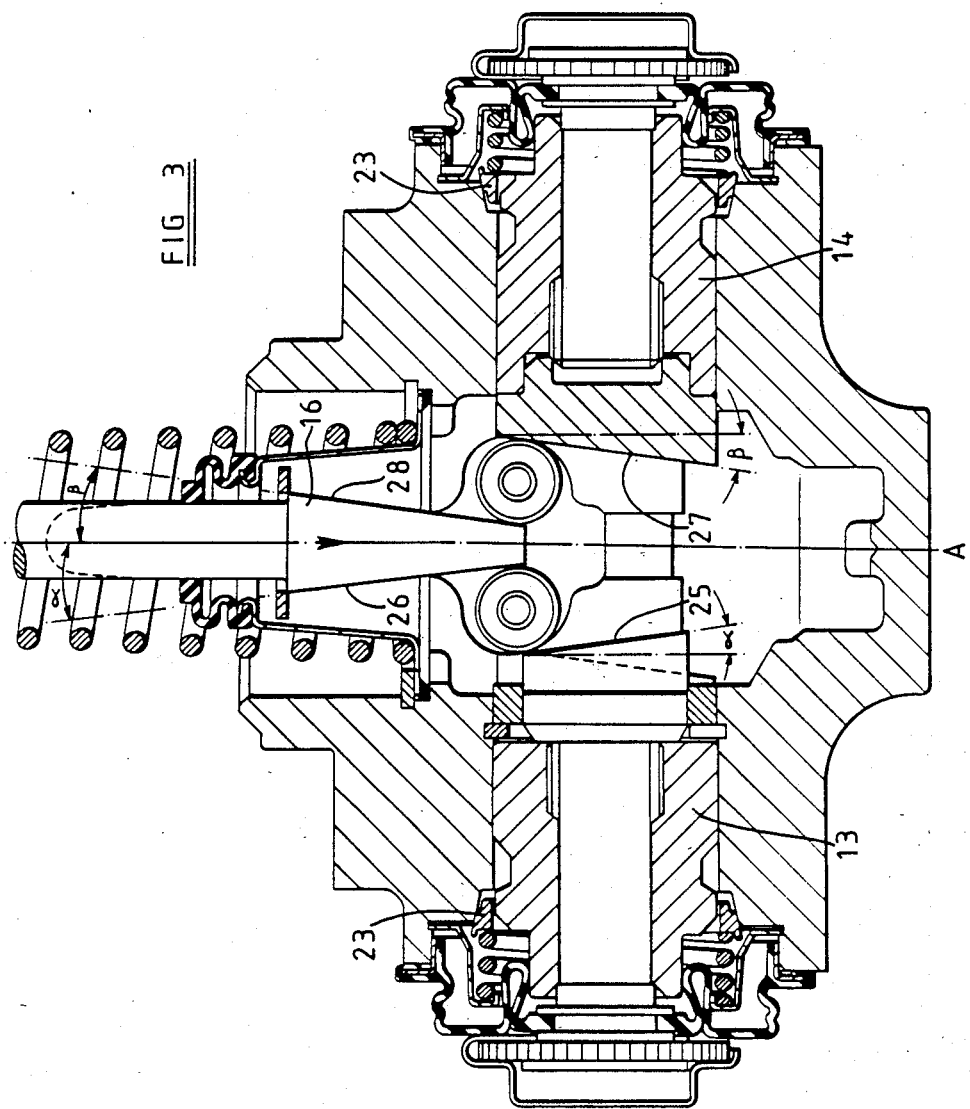

BRAKE ACTUATOR

BACKGROUND OF THE INVENTION

1. Field of the Invention

This invention relates to a shoe drum brake of the leading/trailing type, often referred to as a "simplex" brake, primarily for use in an automotive vehicle.

2. Description of the Prior Art

As a result of incorrect tolerances and other allied factors, it is possible for a simplex brake, when actuation is initiated, to operate temporarily and unpredictably with trailing shoe lead, particularly when the brake is in new condition. In the commonly used layouts using two such brakes on a single vehicle axle, it is possible for one of the brakes to adopt such a trailing shoe lead, while the other brake operates normally in a leading/trailing mode, resulting in temporary braking instability. Although this tendency usually disappears after an initial "bedding in" period, the temporary instability can lead to problems of varying seriousness, resulting in adverse driver reaction.

BRIEF SUMMARY OF THE INVENTION

An object of the invention, therefore, is to provide a shoe drum brake of the leading/trailing or simplex type in which the aforesaid problem is alleviated or avoided.

According to the present invention, a shoe drum brake of the leading/trailing type comprises a pair of brake shoes mounted adjacent the braking surface of a rotatable brake drum, an actuator having a pair of opposed tappets respectively engaged with said shoes and thrust-applying means disposed between the tappets and operable to separate the tappets for actuation of the brake shoes, restraint means acting to transmit inwardly directed forces arising on at least one of the tappets to a fixed surface, and means acting to ensure that, for each brake application, the tappet associated with the trailing shoe moves to engage that shoe with the brake drum in advance of such engagement by the leading shoe.

In one convenient arrangement, each tappet is operatively associated with an automatic adjuster device of which the adjusting function is dependent upon rotation between a pair of components interengaged by way of a threaded connection incorporating a thread clearance which permits a predetermined free movement of the associated tappet without corresponding operation of its adjuster device, such free movement setting the maximum predetermined clearance between the brake shoes and said drum surface, the thread clearance in one of the adjusters differing by a predetermined amount from that in the other adjuster in order to permit outward adjustment of one of the tappets to commence in advance of the other and thereby maintain said predetermined maximum clearance of its associated brake shoe less than that of the other shoe.

Preferably, each tappet has two parts interconnected by a non-reversible screw thread connection to form a strut of which the length is variable by relative rotation between the parts, one of the parts being connected to a control device by a reversible thread connection which incorporates said thread clearance.

The force-applying means may conveniently be a wedge with rollers arranged at either side thereof to transmit thrust from the wedge to the tappets, the inclination to the wedge longitudinal direction of the roller engaging surfaces of the wedge and tappet at either side of the wedge then differing in such a manner as to ensure that outward movement of one tappet for a given wedge actuating movement is greater than the other.

Preferably, the roller engaging surfaces at one side of the wedge are inclined at the same first angle to the wedge longitudinal direction, and the corresponding surfaces at the other side of the wedge are inclined at the same second angle to the wedge longitudinal direction, the first and second angles being different.

The various forms of the actuator of the invention, when incorporated in an internal shoe drum brake, ensure that the trailing shoe is always applied to the brake drum first, thereby improving the work distribution between the shoes. Moreover, this mode of operation results in a "low factor" brake which is less sensitive to changes in lining friction levels and exhibits greater braking stability than some conventional leading/trailing shoe brakes.

BRIEF DESCRIPTION OF THE DRAWINGS

The invention will now be described, by way of example, with reference to the accompanying drawings wherein:

FIG. 2 is a longitudinal cross-sectional view of a first embodiment of an actuator of the brake of the invention;

FIG. 3 is a view similar to FIG. 2 of a second embodiment of the brake actuator.

DETAILED DESCRIPTION

Figure 1:
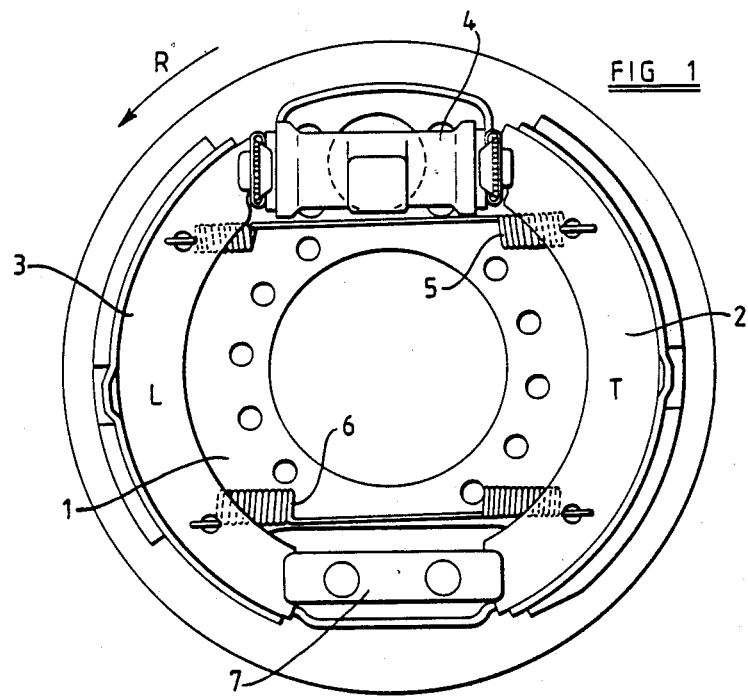
FIG. 1 is an elevational view of one form of shoe drum brake of the invention.

Referring to FIG. 1 of the drawings, the drum brake shown therein has a torque plate 1 carrying a pair of brake shoes 2, 3. An actuator 4 is rigidly mounted on the torque plate between one pair of adjacent shoe ends and is operable to move the shoes outwardly into braking engagement with a surrounding brake drum (not shown) against the action of a pair of shoe return springs 5, 6. The other pair of adjacent shoe ends engage a torque-reacting abutment member 7 rigidly fixed to the torque plate. The normal forward direction of drum rotation is indicated by the arrow R. With the drum rotating in the direction shown by the arrow R, the shoe 3 will be the leading shoe (L) and shoe 2 the trailing shoe (T).

A first embodiment of the actuator is illustrated in greater detail in FIG. 2 and has a body 10 with an axial through bore 11 and a transverse bore 12 extending at right angles to the bore 11. The bore 11 contains a pair of opposed tappets 13 and 14 disposed respectively in portions 11A, 11B of the bore 11 at either side of the bore 12, the tappets being normally engaged respectively, in use, with the brake shoes 2, 3 (FIG. 1) for the purpose of applying brake actuating forces to the shoes. Such forces are applied to the tappets 13 and 14 by means of a wedge device 15 which includes a wedge 16 fast with and reciprocal by means of an actuating rod 17, the wedge being located between a pair of rollers 18, 19 which would normally be carried by a cage (not shown) mounted on the rod 17.

Because the wedge device is not fixed in the direction transverse to its longitudinal axis A, it is necessary to establish a fixed datum to ensure that the tappets always return to the same retracted positions.

For this purpose, a fixed internal surface 20 of the body is inclined relative to the wedge longitudinal axis A in a direction opposite to the direction of inclination of the opposed actuating surface 16A of the wedge, the roller 18 being disposed between the surfaces 20 and 16A. The angles of inclination of these surfaces relative to the axis A are preferably, although not essentially, the same. The surface 20 is formed on an insert 21 secured to the body 10, although it may be formed on an internal surface of the body proper, should this be convenient in practice.

The wedge 16, when urged in the direction of the arrow in FIG. 1, actuates the tappets via the rollers 18, 19 in conventional manner. However, the fact that the roller 18 bears on the inclined fixed surface 20 of the housing, means that the wedge is constrained to move in a substantially linear manner during actuation of the tappets, the result of which is that force which would otherwise be transmitted from the trailing shoe tappet 14 to the leading shoe tappet 13 are instead reacted on the housing at the surface 20. This arrangement also ensures that the tappets return to the same retracted positions determined by engagement of the roller 18 on the fixed surface 20. The tappets incorporate respective automatic adjusters having essentially the same components and only that associated with the tappet 13 will be described in detail.

The tappet 13 has an internal axial bore which is threaded to receive an externally threaded adjuster shaft 22. The tappet and adjuster shaft thus constitute a strut of which the length may be varied by rotating the tappet so as to cause the adjuster shaft to move in one axial direction or the other. The external surface of the tappet is formed with a reversible screw thread, upon which is engaged a correspondingly internally threaded clutch ring 23 which is normally urged by a spring 24 into clutching engagement with an internal surface of the housing, as will be well understood in the art. A clearance is built into the threads of the reversible thread such that a predetermined outward actuating movement of the tappet 13 may take place without actuation of the adjuster, such clearance thereby setting the maximum permitted shoe to drum clearance of the brake shoe 3 actuated by this tappet. As will be understood, when outward movement of the tappet exceeds this predetermined maximum value, the clutch ring is displaced from the housing against the action of the spring 24 and is rotated by interaction of the reversible threads so that when the clutch ring is re-engaged with the housing upon retraction of the tappet, the tappet is caused to rotate in a direction such as to cause outward movement of the adjuster shaft 22 to a new adjusted position.

In order to ensure that the trailing shoe always contacts the drum in advance of the leading shoe, the respective clearances at each of the reversible threads, represented respectively by the references S1, S2 are different, the clearance S2 at the trailing shoe T being smaller than that of S1 at the leading shoe L, so that the maximum shoe to drum clearance of the trailing shoe is always maintained smaller than that at the leading shoe, enabling the trailing shoe to contact the drum earlier than the leading shoe each time the brake is actuated.

An alternative means of achieving advance engagement of the leading shoe against the drum is illustrated in FIG. 3 of the drawings which shows an actuator similar to that in FIG. 2 except that the clearances in the reversible threads between the clutch members 23 and the tappets 13 and 14 with which the clutch members are respectively engaged are, in this case, substantially equal. In order to ensure that the trailing shoe tappet moves to apply its associated shoe in advance of the trailing shoe tappet, the surfaces 25 and 26 respectively of the tappet 13 and wedge 16 are inclined at an angle $\alpha$ to the longitudinal axis A of the wedge, and the corresponding surfaces 27 and 28 respectively of the tappet 14 and the wedge are inclined at an angle $\beta$ to the axis A, angle $\beta$ being greater than angle. The tappet 14 with the larger angle $\beta$ is associated with the trailing shoe so that the outward movement of the trailing shoe tappet, for a given linear movement of the wedge along its axis A, will be greater than that of the leading shoe tappet and again will ensure that the trailing shoe is applied to the drum in advance of the leading shoe. Preferably, the angles $\alpha$ and $\beta$ are chosen so that the ratio $\alpha; \beta$ is between 1:1.5 and 1:2.

Figure 4:
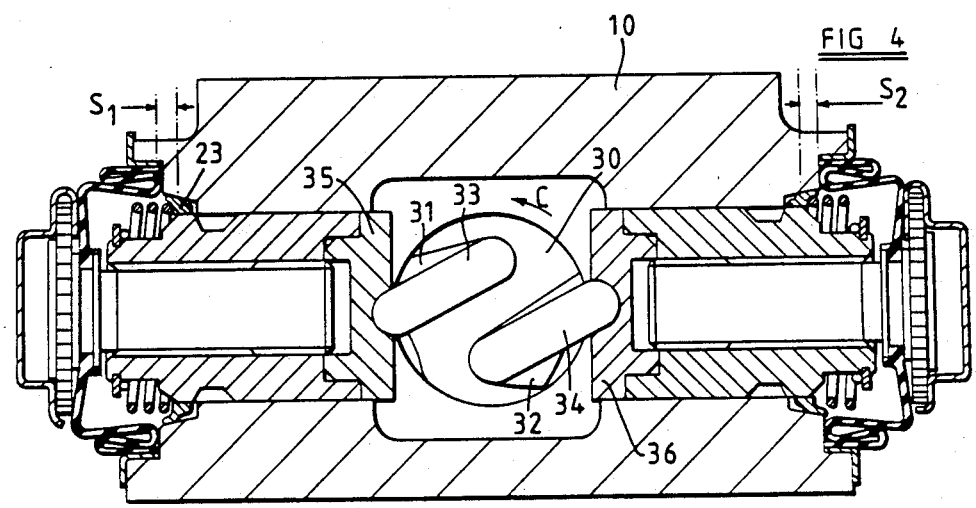
FIG. 4 is a view similar to FIGS. 1 and 2 of a third embodiment of the brake actuator.

In a further alternative embodiment of the actuator illustrated in FIG. 4, the arrangement of the tappets 13, 14 and associated adjuster devices is similar to that of the previous embodiments, but a different force-applying means is employed. This is in the form of a camshaft 30 rotatably mounted in the actuator housing 10 and having opposed recesses 31, 32 containing respective force-transmitting struts 33, 34, the outer ends of which are engaged with inserts 35, 36, of relatively hard material, housed in the inner ends of the tappets.

Rotation of the cam shaft in the direction indicated by the arrow C causes separation of the tappets and the shoes engaged therewith in conventional manner. As in the embodiment of FIG. 3, the trailing shoe is caused to contact the brake drum always in advance of the leading shoe by providing differential clearances $S_1$, $S_2$ respectively in the reversible threads between the adjuster clutch rings 23 and tappets 13, 14. In this embodiment the fixed return datum for the tappets is conveniently provided by the cam shaft itself.

It will be understood that in the embodiments of the invention which reply upon differential adjuster clearances for effecting advance application of the trailing shoe against the drum, such clearance may alternatively be in the non-reversible thread between the tappets 13, 14 and their respective adjuster shafts 22, or partly in both said reversible and non-reversible threads. In the cam-actuated embodiment, instead of relying on differential adjuster clearances in the manner described, it is possible to arrange the cam so that it always displaces the trailing shoe via the associated tappet in advance of the leading shoe.

I claim:

1. A shoe drum brake of the leading/trailing type comprising:
   a leading brake shoe and a trailing brake shoe each mounted adjacent the braking surface of a rotatable brake drum;
   an actuator having leading and trailing opposed tappets respectively engaged with said leading and trailing shoes;
   thrust-applying means disposed between said tappets and operable to move said tappets outwardly away from each other for actuation of said brake shoes;
   restraint means acting to transmit inwardly directed forces applied to at least one of said tappets to a fixed surface; and
   automatic leading and trailing adjuster devices operatively asssociated with said leading and trailing tappets, respectively, each comprising, a pair of components relatively rotatable with respect to each other, a threaded connection interengaging said pair of components, and a thread clearance in said threaded connection for providing a predetermined free movement of the associated tappet without producing corresponding operation of the respective adjuster device, said thread clearance setting a predetermined maximum clearance between the respective brake shoe and said brake drum, the thread clearance in said trailing adjuster device being less by a predetermined amount than the thread clearance in said leading adjuster device, so that upon actuation of said brake outward movement of said trailing tappet commences before outward movement of said leading tappet causing said trailing brake shoe to engage said brake drum before said leading brake shoe and maintaining said predetermined maximum clearance between said trailing brake shoe and said drum less than said predetermined maximum clearance between said leading brake shoe and said drum.

2. A shoe drum brake as claimed in claim 1 wherein:

each tappet comprises a first part and a second part interconnected by a non-reversible screw thread to form a strut having a length variable by relative rotation between said parts;

said pair of components of each automatic adjuster device comprise one of said first and second parts and a control device connected to said one of said first and second parts by said threaded connection;

said threaded connection interengaging said pair of components comprises reversible screw threads on said components; and said thread clearance is provided in said reversible screw threads.

3. A shoe drum brake as claimed in claim 3 wherein;

said actuator comprises a body member mounted between said brake shoes, a bore extending through said body, and said tappets slidably and rotatably mounted in said bore in spaced relationship; and said thrust applying means comprises a cam shaft rotatably mounted in said body member, and opposed thrust members operatively engaging between said cam shaft and said tappets so that rotation of said cam shaft in one direction moves said tappets apart.

4. A shoe drum brake as claimed in claim 3 wherein:

camming recesses are provided in substantially opposite sides of said cam shaft;

said thrust members comprises force transmitting struts each having one end engaging in one of said recesses and the other end engaging an inner end of a respective tappet; and said restraint means comprises said cam shaft.

5. A shoe drum brake as claimed in claim 2 wherein:

said actuator comprises a housing member, a bore extending through said housing member, an internal clutch surface on said housing member, and said tappets slidably and rotatably mounted in said bore in spaced relationship;

said first part of each tappet comprises a hollow cylinder having an at least partially non-reversibly threaded internal axial bore;

said second part of each tappet comprises an at least partially externally non-reversibly threaded shaft within said hollow cylinder;

one of said reversible screw threads comprises an external screw thread on said first tappet part; and said control device comprises a clutch ring having an internal reversible screw thread engaging said external screw thread on said first tappet part, and an external clutch surface releasably engageable with said internal clutch surface on said housing member.

6. A shoe drum brake as claimed in claim 1 wherein said thrust-applying means comprises:

a cam shaft rotatably mounted in said actuator; and opposed thrust members cooperatively engaging said cam shaft and said tappets so that rotation of said cam shaft in one direction moves said tappets outwardly away from each other.

7. A shoe drum brake as claimed in claim 6 wherein:

said restraint means comprises said cam shaft.

8. A shoe drum brake as claimed in claim 1 wherein said thrust-applying means comprises:

a wedge member mounted for movement in a longitudinal direction extending between said tappets;

leading and trailing inclined surfaces on said wedge member facing away from each other and inclined relative to said longitudinal direction; and roller means operatively disposed between said inclined surfaces and said tappets so that movement of said wedge member in said longitudinal direction moves said tappets outwardly away from each other.

9. A shoe drum brake as claimed in claim 8 and further comprising:

inclined surfaces on said tappets engaging said roller means.

10. A shoe drum brake as claimed in claim 8 wherein:

said restraint means comprises a fixed surface on said actuator engaged by said roller means between said wedge member and said leading tappet.

11. A shoe drum brake as claimed in claim 10 wherein:

said fixed surface is inclined oppositely with respect to said leading inclined surface.

12. A shoe drum brake as claimed in claim 11 wherein:

said fixed surface and leading inclined surface have the same angle of inclination with respect to said longitudinal direction.

* * * * *